UNITED STATES PATENT OFFICE.

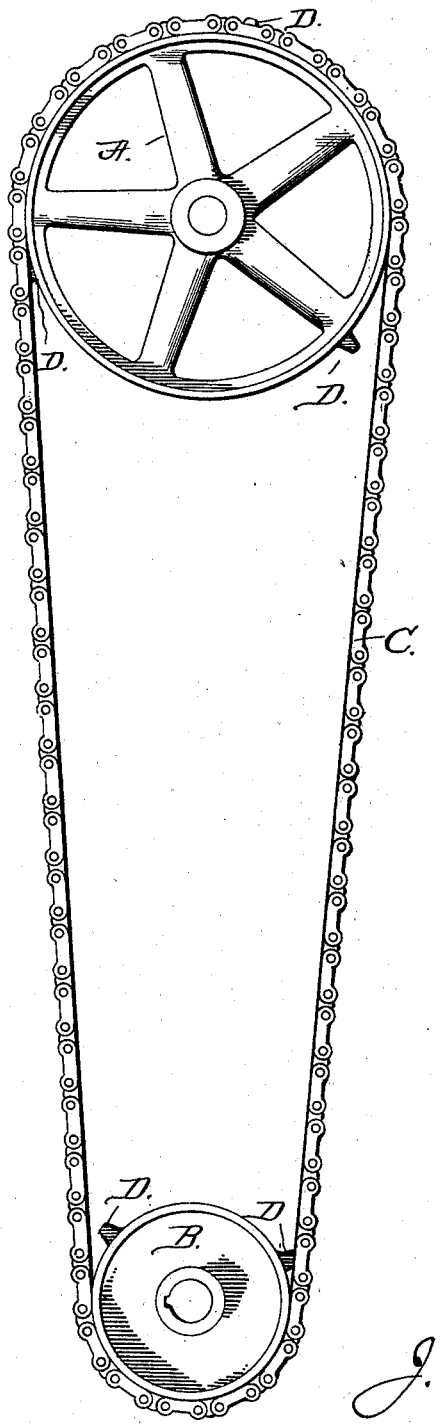

JAMES C. ANDERSON, OF HIGHLAND PARK, ILLINOIS.

CHAIN-BELT GEARING.

SPECIFICATION forming part of Letters Patent No. 647,243, dated April 10, 1900.

Application filed July 31, 1899. Serial No. 725,664. (No model.)

*To all whom it may concern:*

Be it known that I, JAMES C. ANDERSON, a citizen of the United States, residing at Highland Park, in the county of Lake and State of Illinois, have invented certain new and useful Improvements in Chain-Belt Gearing; and I do hereby declare the following to be a full, clear, and exact description of the invention, such as will enable others skilled in the art to which it appertains to make and use the same.

My invention relates to certain new and useful improvements in chain-belt gearing.

It has for its object to so construct, combine, and arrange the chain relatively with the sprocket-wheel as to insure progressive contact of the chain-links with the sprockets of the wheel, and thus avoid unequal wear of the respective links of the chain; and with this end in view my invention consists of a chain-belt gearing embodying in its organization sprocket-wheels having sprockets arranged thereon predeterminedly farther apart than the pitch length of the chain-links and at the same time equal to an exact multiple of such pitch length of the chain-links and a sprocket-chain the links of which are of uniform pitch and the number of which is more or less than an exact multiple of the sprockets on the wheel, as will be hereinafter more fully explained.

In order that those skilled in the art to which my invention appertains may fully understand the same, I will proceed to describe the construction, operation, and advantages thereof, referring by letter to the accompanying drawing, which represents a plan view of two sprocket-wheels and a connecting-chain embodying the features of my invention.

A and B represent the sprocket-wheels, and C the chain.

D are the sprockets on the wheels, and they are so disposed upon the periphery of the wheels that the distance between them shall be greater than the pitch of any one of the links of the chain C and at the same time equal to a multiple of the pitch of any one link.

The links of the chain C are all uniform in size and are especially uniform in pitch length, and in the illustration shown in the drawing such pitch length of the links is an equal division of the pitch of the sprockets D, and the number of the links constituting the entire chain length is either more or less than an exact multiple of the number of sprockets on the wheels.

In the instance shown in the drawing the sprocket-wheels are shown with three sprockets, while the number of links shown in the chain is fifty-five, (55.) Hence the number of links is one more than an exact multiple of the number of sprockets on either of the sprocket-wheels, and if the chain were shown as composed of fifty-three (53) links it would be one less than an exact multiple of the number of sprockets on either wheel and would come within the conditions covered by my invention.

From the construction and arrangement above set forth it will be seen that the chain in traversing the peripheries of the sprocket-wheels will have its individual links successively and progressively brought into working contact with the sprockets D, so that when any given link is released from operative contact with any given sprocket it will not engage the sprocket during the next succeeding traverse of the chain and for a length of time proportioned to the number of links employed to equal the pitch of the sprockets, or, in other words, the individual links constituting the entire chain are progressively housed over the successive sprockets of the wheels, and as the chain is initially the weaker part of the gearing the life of the chain is of necessity increased by the use of the links progressively, as hereinbefore described.

What I claim as new, and desire to secure by Letters Patent, is—

In a chain-belt gearing, a sprocket-wheel having sprockets predeterminedly farther apart than the pitch of the chain-links, in combination with a sprocket-chain, the links of which are uniform in pitch and the number of which is more or less than an exact multiple of the number of sprockets on the wheel, substantially as and for the purpose set forth.

In testimony whereof I affix my signature in presence of two witnesses.

JAMES C. ANDERSON.

Witnesses:
JENNIE G. BOOTH,
DANL. W. BONN.